United States Patent [19]

Griffen et al.

[11] Patent Number: 5,336,994

[45] Date of Patent: Aug. 9, 1994

[54] MAGNETO-RESISTIVE TACHOMETER ASSEMBLY WITH REVERSIBLE COVER AND RELATED METHOD

[75] Inventors: Neil C. Griffen, Westerville; Mark Ayzenberg, Columbus, both of Ohio

[73] Assignee: Lake Shore Cryotronics, Inc., Westerville, Ohio

[21] Appl. No.: 979,655

[22] Filed: Nov. 20, 1992

[51] Int. Cl.$^5$ .............. G01R 1/00; H01S 4/00; B65D 81/00

[52] U.S. Cl. .................. 324/174; 324/262; 206/328; 29/592.1

[58] Field of Search ............ 324/207.11, 207.25, 324/173, 174, 262, 160, 166; 206/328, 334; 29/592.1, 595, 596

[56] References Cited

U.S. PATENT DOCUMENTS

| | | | |
|---|---|---|---|
| 3,764,888 | 10/1973 | Anderson | 322/20 |
| 3,997,782 | 12/1976 | Willits | 250/231 |
| 4,274,053 | 6/1981 | Ito et al. | 324/174 |
| 4,319,188 | 3/1982 | Ito et al. | 324/173 |
| 4,418,372 | 11/1983 | Hayashida et al. | 360/113 |
| 4,506,217 | 3/1985 | Rothley et al. | 324/208 |
| 4,639,807 | 1/1987 | Sekizawa et al. | 360/113 |
| 4,656,377 | 4/1987 | Akiyama et al. | 310/68 |
| 4,668,913 | 5/1987 | Vinal | 324/208 |
| 4,686,472 | 8/1987 | Van Ooijen et al. | 324/252 |
| 4,712,064 | 12/1987 | Eckardt et al. | 324/208 |
| 4,766,376 | 8/1988 | Takahashi et al. | 324/208 |
| 4,786,870 | 11/1988 | Kawamata et al. | 324/208 |
| 4,800,457 | 1/1989 | Kryder et al. | 360/113 |
| 4,816,948 | 3/1989 | Kamo et al. | 360/113 |
| 4,818,939 | 4/1989 | Takahashi et al. | 324/208 |
| 4,851,771 | 7/1989 | Ikeda et al. | 324/208 |
| 4,853,631 | 8/1989 | Carmen | 324/208 |
| 4,853,632 | 8/1989 | Nagano et al. | 324/208 |
| 4,857,841 | 8/1989 | Hastings et al. | 324/208 |
| 4,866,382 | 9/1989 | Carmen | 324/208 |
| 4,874,053 | 10/1989 | Kimura et al. | 180/79.1 |
| 4,890,059 | 12/1989 | Guentner | 324/174 |
| 4,914,387 | 4/1990 | Santos | 324/166 |
| 4,914,389 | 4/1990 | Juds | 324/207 |
| 4,922,197 | 5/1990 | Juds et al. | 324/207 |
| 4,975,675 | 12/1990 | Becker | 338/32 R |
| 4,988,220 | 1/1991 | Christiansen et al. | 384/448 |
| 4,992,733 | 2/1991 | Griebeler | 324/207 |
| 5,019,776 | 5/1991 | Kawamata et al. | 324/207 |
| 5,041,784 | 8/1991 | Griebeler | 324/207 |

*Primary Examiner*—Walter E. Snow
*Attorney, Agent, or Firm*—Nixon & Vanderhye

[57] ABSTRACT

A tachometer assembly for monitoring the rotation of an output shaft for measuring the rotational velocity and position of rotating shafts, and more specifically, to a magneto-resistive tachometer assembly which incorporates a dual purpose cover which, during normal use, fits over the tachometer drum and electronic sensor package to give physical protection to the unit. In a shipping mode, however, the cover is reversed and performs the function of an alignment tool in that a radial gap between the magnetic drum and magneto-resistive sensor may be preset at the factory during assembly of the unit. Reversal of the cover to its normal in use position is done in such a way that the preset radial gap is undisturbed.

31 Claims, 6 Drawing Sheets

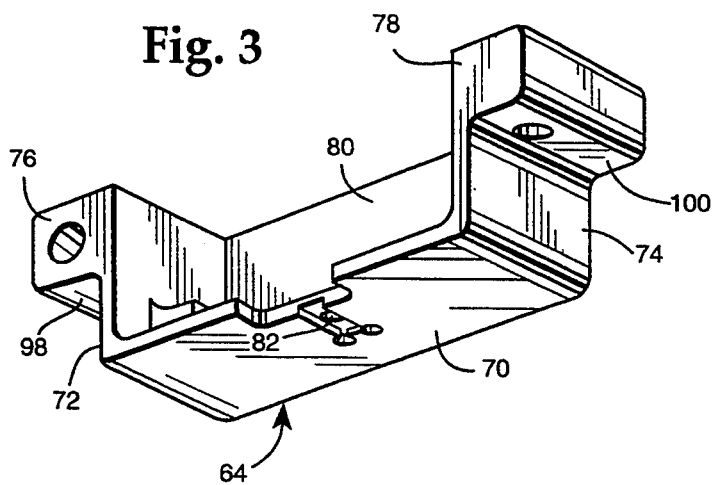
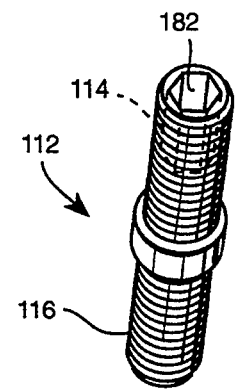
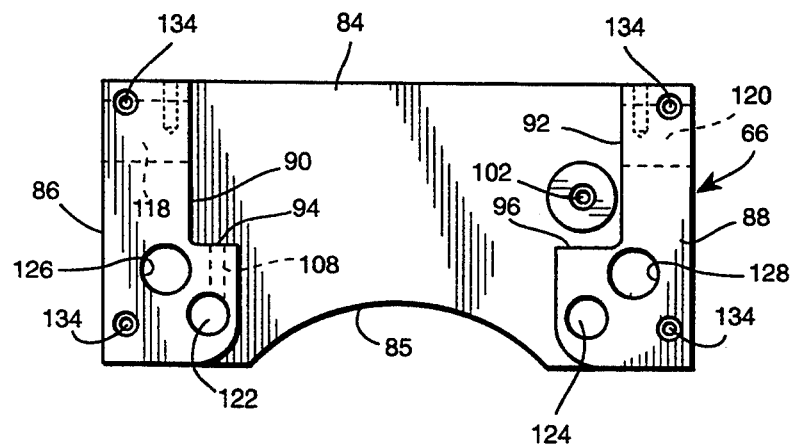
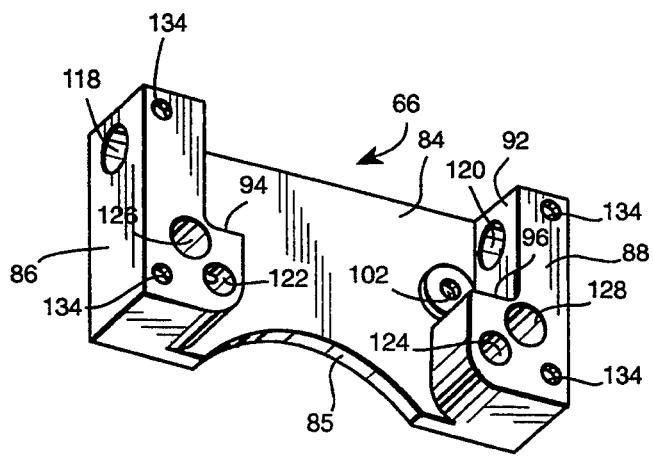

MAGNETO-RESISTIVE TACHOMETER ASSEMBLY WITH REVERSIBLE COVER AND RELATED METHOD

FIELD OF THE INVENTION

The present invention relates to a magneto-resistive tachometer for measuring the rotational velocity and position of rotating shafts, and more specifically, to a magneto-resistive tachometer assembly which incorporates a dual purpose cover which, during normal use, fits over the tachometer drum and electronic sensor package to give physical protection to the unit. In a shipping mode, however, the cover is reversed and performs the function of an alignment tool in that a radial gap between the magnetic drum and magneto-resistive sensor may be present at the factory during assembly of the unit. Reversal of the unit to its normal in use position is done in such a way that the preset radial gap is undisturbed.

BACKGROUND AND SUMMARY OF THE INVENTION

In commonly assigned application Ser. No. 07/822,016, now U.S. Pat. No. 5,293,125 (the entirety of which is incorporated herein by reference), there is disclosed a new and unique type of magneto-resistive tachometer. Briefly, in the aforementioned application, a magneto-resistive sensor arrangement is provided which utilizes a non-magnetically biased magneto-resistive sensor element; a magnetized drum; and associated integrated circuit based electronics. More specifically, the sensor arrangement includes an enclosure, a drum, a magneto-resistive probe, a hub, and an electronics module. The generally cylindrical enclosure is bolted onto the end plate of a motor casing or housing (e.g., a standard NEMA 4.5 inch and 8.5 inch C-Face end plate of an AC or DC electric motor). The enclosure provides a circular opening through which the motor shaft protrudes. In one exemplary embodiment, the hub is fastened to the end face of the motor shaft, and a magneto-resistive drum is fastened to the hub. The drum includes two magnetized tracks: an incremental magnetic ("INC") track and an index pulse ("Z") track. Such magnetized tracks are formed in a conventional manner by magnetizing the periphery of the drum. The "Z" track encodes one pattern (pulse) per revolution, while the "INC" track encodes (in the preferred embodiment) 480 patterns (pulses) per revolution.

The enclosure is formed with at least one, and preferably a pair of planar saddle surfaces, each having a rectangular opening therethrough. In one exemplary embodiment, a generally rectangular sensor housing or module is detachably fastened to the saddle surface and protrudes radially through the rectangular opening into the interior of the enclosure. The sensor housing supports a two track magneto-resistive probe at a free end thereof for sensing the "INC" track and the "Z" track, respectively. The preferred embodiment probe comprises a conventional magneto-resistive sensing element(s) and a miniature PC board providing signal processing circuitry.

The mounting arrangement between the enclosure and motor end plate, the enclosure and the sensor module, and the motor shaft and hub/drum provides a self-gapping probe-to-drum spacing of approximately 0.018 plus or minus 0.008 inches, and provides for self-alignment (axially and radially) between the probe and the drum. Thus, one significant innovation of the preferred embodiment design is that the magnetic drum and mounting hub, enclosure, and sensor module can be assembled onto a motor housing and put into operation without extensive alignment procedures. In other words, after the magnetic drum and hub have been fitted to the end face of the motor shaft and bolted in place, the enclosure is then bolted into place on the motor housing end plate. Finally, the sensor module is slipped into the radial opening in the enclosure and bolted into place on the saddle surface. The wires are connected and the tachometer is ready to operate, with no special adjustment of the location of the probe or sensor module required. With this configuration, the probe is removable and replaceable with another probe without any realignment of the assembly. This feature is advantageous for both assembly and service repair.

Such self-alignment and self-gapping is possible because electric motors are generally produced in accordance with NEMA standards which set the dimensions and tolerances of standard motor facings and shaft sizes. The preferred embodiment enclosure is machined to fit onto NEMA C type motor faces to a tight tolerance. The sensor module saddle mounting surface is also machined on the side of the enclosure to a tight tolerance with respect to the holding rim or lip of the enclosure which interfaces with the motor end plate. By holding these tight tolerances, as well as tight tolerances on the depth of the sensor from the mating surface of the probe to the surface of the sensor, the sensor can be located at a very precise distance from the center-line of the motor shaft.

In a like manner, the hub which is used to hold the magnetic drum onto the motor shaft is also machined to high tolerances. In one exemplary embodiment, the hub has a recess which fits over the end of the motor shaft. The recess is concentric to the center-line or axis of the shaft and to the outer diameter of the hub. Onto this the drum is centered with respect to the outer diameter of the hub held in place by screws or other suitable means (e.g., structural adhesive). The outer diameter of the drum is also machined to a tight tolerance. The depth of the hub recess determines the longitudinal location of the drum with respect to the sensor, and therefore, this depth is also tightly controlled.

In this configuration, the drum and sensor can be precisely located with respect to each other, across a radial gap. The tolerance of the gap between the sensor and drum edge is a function of the dimensional tolerances of the individual parts. According to the NEMA standards for one application, for example, the critical dimensions of the motor facing eccentricity is four thousands of an inch TIR (0.004"). The TIR of the shaft is three thousands of an inch (0.003"). The machining tolerances of the enclosure, probe and hub can be held to a few thousands of an inch or less. By using the tight machining tolerances as described above, the tolerance of the radial gap can be kept to plus-or-minus eight thousands of an inch (+/−0.008") or better.

In order to provide for the self-gapping arrangement as described in the aforementioned commonly owned application, and as explained above, the various components must be machined precisely to very close tolerances and is thus costly to manufacture.

The present invention seeks to alleviate this problem. Applicants have now devised a magneto-resistive tachometer construction which permits loose machining tolerances with final adjustment occurring during assembly on the production floor. The relaxed tolerances also allow for lower cost without sacrificing performance.

More specifically, the magneto-resistive tachometer in accordance with this invention utilizes a dual purpose cover. In normal use, the cover fits over the magnetic drum and electronic sensor to provide physical protection to the unit. In a shipping mode prior to use, however, the cover is reversed or put on backward, and in this orientation, serves as an alignment tool. In other words, with the cover installed in a reverse orientation, the radial gap between the sensor probe and the peripheral edge of the magnetic drum may be set during assembly. The cover is removed and reattached in its normal orientation only after the entire unit is secured to the motor casing, and this is done in such a way that the radial gap need not be reset.

In a presently preferred embodiment of the invention, the tachometer includes a magnetic sensor assembly, a magnetic drum assembly and a reversible cover. The magnetic sensor assembly includes a sensor module and a sensor module base unit which is adapted to receive the sensor module in a generally nested relationship. The sensor module includes probes which must be set at a predetermined radial distance from the peripheral edge of the magnetic drum, and therefore, means are provided which permit adjustment of the sensor module within the sensor module base unit. More specifically, the sensor module is mounted in the sensor module base unit for pivotal movement about a horizontal axis extending parallel to the centerline axis of the drum. The pivot pin is located at one end of the module, while a differentially threaded adjustment screw is located at tim other end of the sensor module, extending vertically through the sensor module and into the sensor module base unit. Rotation of the screw thus causes pivotal movement of the sensor module about the pivot pin such that, depending on the direction of rotation of the screw, the sensor module (and its magnetic probes) is moved toward or away the radially adjacent peripheral edge of the magnetic drum.

The magnetic drum assembly includes an annular drum having a peripheral edge with a pair of annular, magnetic "Z" and "INC" tracks thereon which must be placed in registry with the probes of the sensor module. The drum also includes an adaptor fastened thereto and provided with a central aperture adapted to be fitted over the output shaft of the motor. The magnetic drum assembly also includes one or more sleeve clamp which cooperates with the drum/adaptor to securely fasten the drum assembly to the output shaft of the motor as described in greater detail herein.

The reversible cover in accordance with an exemplary embodiment of the invention includes a main end wall having a large centrally located opening which is designed to seat an annular spacer member to which the magnetic drum assembly may be attached. Above the central aperture, a planar surface of the main end wall is provided with bolt apertures to facilitate mounting of the sensor module base unit (and the sensor module) thereto, directly above and in required radial alignment with the magnetic drum assembly.

The cover also includes side and bottom walls which serve to at least partially enclose the magnetic drum assembly when in its normal, in-use orientation secured to the motor end plate or casing.

During the initial assembly of the unit at the factory, the sensor module assembly (the sensor module and the sensor module base unit) is attached to one portion of the cover, while the magnetic drum is secured to another portion of the cover directly beneath the sensor module assembly. The radial gap between the peripheral edge (incorporating the "Z" and "INC" tracks) of the magnetic drum and magneto-resistive sensor module probes is then preset to the required dimension using the differential screw. The entire unit is then shipped to the customer. After the customer receives the unit, the latter is fixed to the motor casing, with the magnetic drum assembly slipped over the motor shaft until the sensor module base unit abuts the motor casing or end plate. The sensor module base unit is then bolted to the end plate or casing, and the magnetic drum assembly is then secured to the shaft. Since the cover maintains the relative position between the sensor module base unit and the magnetic drum, the customer is assured that the critical gap dimension is maintained. With the sensor module base unit and magnetic drum assembly now also fixed to the motor casing and output shaft, respectively, the cover may be removed without changing the gap. The cover is then reversed and refastened to the opposite sides of the magnetic sensor base unit and magnetic drum in its normal, in-use orientation to provide physical protection to the unit.

In the event, however, the radial gap is altered, the differential screw may again be employed to easily re-set the gap to the required dimension.

In accordance with an exemplary embodiment of the invention, therefore, a tachometer assembly is provided which comprises a sensor module assembly; a magnetic drum assembly; and cover supporting the sensor module assembly and the magnetic drum in predetermined radial alignment with each other in a first orientation of the cover; the cover adapted to partially enclose and protect the sensor module assembly and the magnetic drum assembly in a second orientation reversed relative to the first orientation.

In another aspect, the invention provides a tachometer assembly comprising a magnetic drum having a peripheral edge surface, the drum adapted for attachment to an output shaft of a rotary machine; a sensor module; a sensor module base unit supporting the sensor module, the sensor module base unit adapted for attachment to a casing of the rotary machine; and a cover supporting, in a first, non-use orientation, the magnetic drum assembly, the sensor module and the sensor module base unit in a spatial relationship such that a predetermined radial gap between the sensor module and the peripheral edge surface of the magnetic drum assembly is established; the magnetic drum assembly having means for attaching the magnetic drum assembly to the output shaft, and the sensor module base unit having means for attaching the sensor module base unit to an end plate of the rotary machine with the cover in the first non-use position, the cover ada for removal, reversal and remounting to the rotary machine casing in a second, in-use orientation which is reversed relative to the first, non-use orientation, and without disturbing the predetermined radial gap.

In still another aspect, the invention provides a tachometer assembly which comprises a cover unit having an end wall with front and back surfaces, a pair of side walls extending from the front surface of the end wall, and a bottom wall extending from the front surface of the end wall between the side walls, the end wall having a centrally located aperture therein; a magnetic drum assembly having a circumferential peripheral edge surface provided with at least one magnetic pattern thereon; a sensor module assembly including at least one sensing probe; wherein the magnetic drum assembly is mounted on the back surface of the end wall substantially concentrically with the centrally located apertures, and the sensor module assembly is mounted on the back surface of the end wall in a first shipping orientation to maintain at least one sensing probe a predetermined radial distance from the magnetic pattern; and wherein the cover unit is adapted to be reversed to a use orientation such that the sensor module assembly and the magnetic drum assembly will engage the front surface of the cover unit and the side walls and the bottom wall will at least partially enclose the sensor module assembly and the magnetic drum assembly.

Finally, the invention provides a method of assembling and aligning components of a tachometer relative to each other and to a shaft of a rotary machine, the components including a magnetic drum, a periphery of which is provided with at least one magnetic pattern; a sensor module assembly including a sensor module having a probe, and a sensor module base unit adjustably supporting the sensor module; and a cover unit, the method comprising the steps of:

a) mounting the magnetic drum and the sensor module assembly on one side of the cover;

b) adjusting said sensor module and probe relative to said sensor module base unit and said magnetic drum to obtain a predetermined radial gap between the probe and the magnetic pattern of the magnetic drum;

c) securing the magnetic drum on the rotary machine shaft;

d) securing the sensor module assembly to a casing of the rotary machine through which the shaft projects;

e) removing the cover unit, leaving the magnetic drum on the shaft and the sensor module assembly on the casing of the rotary machine;

f) reversing the cover unit; and g) reattaching it to the casing.

The invention as described herein provides unique advantages in terms of radial gap setting, cost, simplicity and ease of manufacture and use.

Additional objects and advantages of the invention will become apparent from the detailed description which follows.

BRIEF DESCRIPTION OF THE DRAWINGS

These and other features and advantages provided by the present invention may be better and more readily understood by referring to the following detailed description of presently preferred exemplary embodiments in conjunction with the drawings, of which:

FIG. 3 is a perspective view of a sensor module component illustrated in FIG. 1, again with the sensor electronics removed;

FIG. 4 is a front elevation of a sensor module base unit illustrated in FIG. 1;

FIG. 5 is a perspective view of the sensor module unit base unit illustrated in FIG. 3;

FIG. 6 is a perspective view of a differential adjustment screw illustrated in FIG.

DETAILED DESCRIPTION OF THE DRAWINGS

Figure 1:
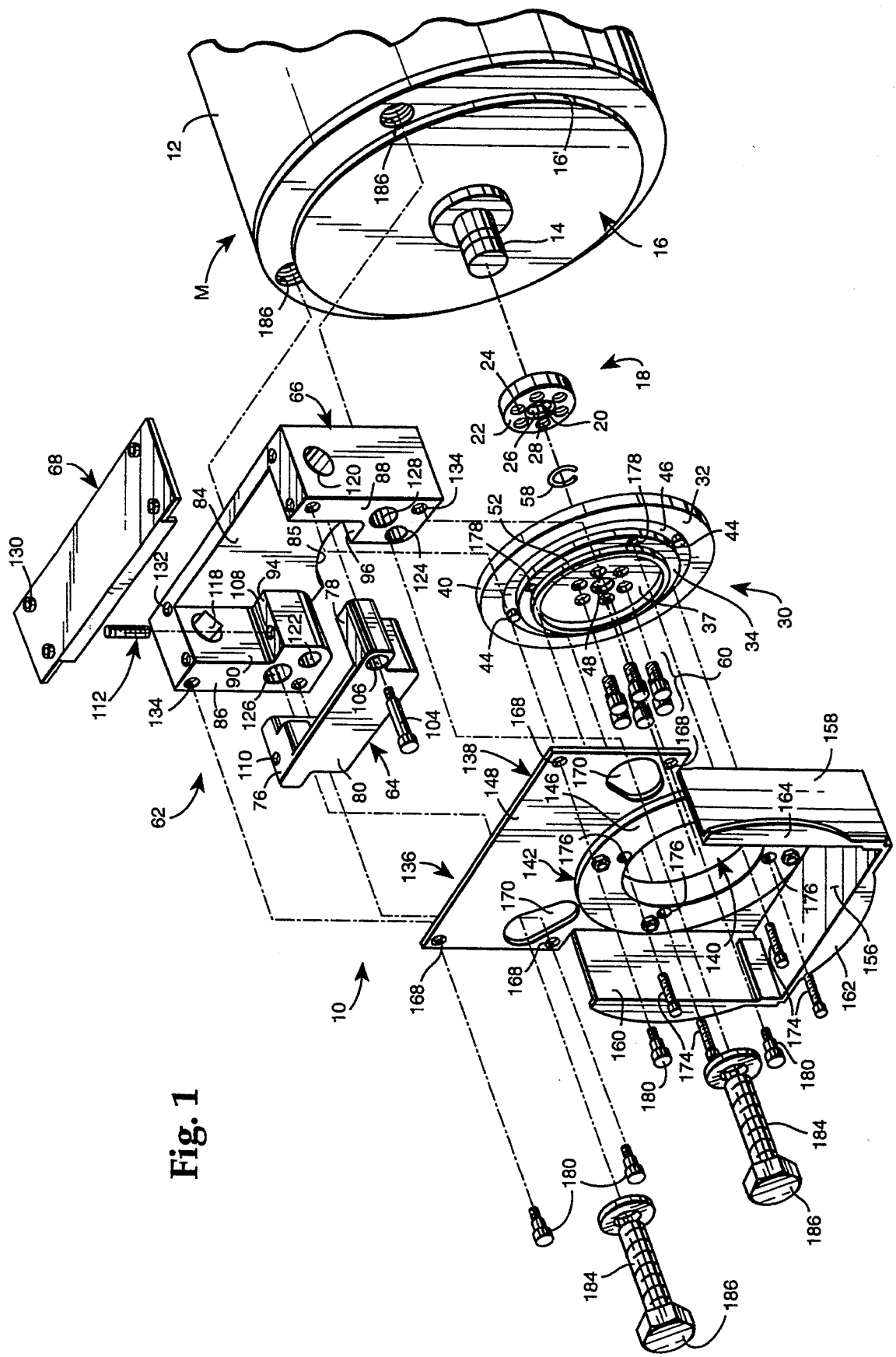
FIG. 1 is an exploded view of the magneto-resistive tachometer and associated cover in accordance with an exemplary embodiment of the invention, with sensor electronics removed for clarity, and with the cover shown in a reversed or shipping mode.

References herein to "forward" (or "front"), "rearward" (or "back"), "vertical" and "horizontal", etc. are made regarding the tachometer assembly and its various components as shown in FIG. 1 in a generally upright orientation. Thus, for example, a forward wall or surface is farther away from the motor than a rearward wall or surface.

With reference to FIG. 1, a tachometer assembly 10 in accordance with the invention is illustrated in exploded form, with an associated motor M having a casing or housing 12 (a NEMA-C standard casing, for example) and an output shaft 14 extending beyond an end plate 16 of the casing 12.

The tachometer assembly includes a sleeve clamp 18 adapted to be slidably received over the shaft 14. The sleeve clamp 18 is a relatively thick annular member having a central aperture 20 with a diameter slightly greater than the shaft 14 O.D. The front face 22 of the sleeve clamp is formed with a plurality of equally spaced threaded bores 24, and the juncture of face 22 and the interior surface 26 of the aperture 20 is bevelled as at 28 for a purpose described below.

A magnetic drum assembly 30 is also slidably receivable over the motor output shaft 14. When the sleeve clamp 18 and magnetic drum assembly 30 are secured to the shaft 14, they are concentric with each other and with shaft 12.

The magnetic drum assembly 30 includes a radially outer drum 32 and a radially inner adapter as FIG. 1, the drum 32 comprises an annular ring having a relatively large central aperture 35. The drum is formed with a pair of annular, radially spaced shoulders 36, 38 facing in opposite directions on opposite sides of the drum. The peripheral edge surface 40 of the drum is provided with magnetic patterns which are preferably arranged as two, axially spaced, annular "Z" and "INC" tracks as disclosed in copending application Ser. No. 07/822,016.

Figure 2:
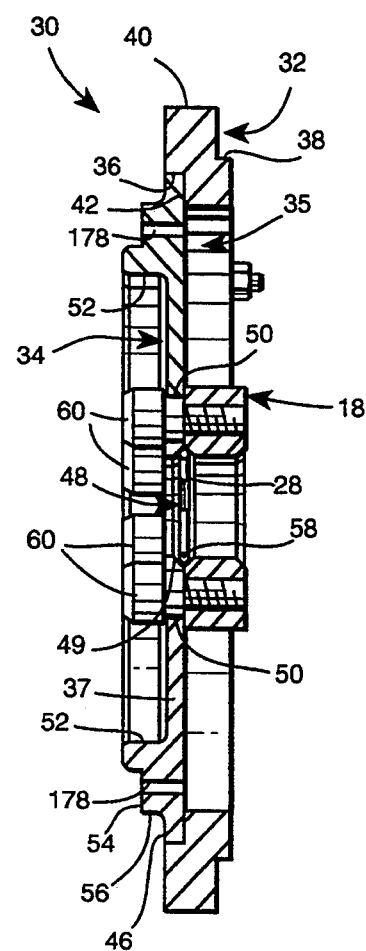
FIG. 2 is a side sectional view of the magnetic drum and associated adapter shown in FIG. 1.

The annular shoulder 36 and the adjacent radial surface 42 of the drum define a counterbore adapted to receive the adapter 34 in nested relationship as best seen in FIG. 2. The adaptor 34 is secured to the drum surface 42 by means of a plurality of fasteners 44 (FIG. 1) extending through a radially outer flange 46 of the adaptor and into threaded bores (not shown) in the drum surface 42.

The adaptor 34 is an annular disc-like member, having a flat central surface 37 formed with a central aperture 48 surrounded by a plurality of holes 50. The aperture 48 is similar in diameter to the aperture 20 in sleeve clamp 18 and likewise is adapted for sliding engagement over the shaft 14, as explained in greater detail below. Aperture 48 is formed with a bevelled edge 49 similar to edge 28.

The adaptor 34 is formed with an axially extending peripheral wall 52 which extends away from surface 37. Radially beyond the wall 52 is a radial wall or flange 54, and an axial shoulder 56 which connects to the radially outermost flange portion 46 of the adaptor which is seated within the counterbore defined by drum surfaces 36 and 42.

The sleeve clamp 18 is utilized to secure the magnetic drum assembly 30 to the motor shaft 14 in the following manner. With the sleeve clamp 18 placed on the shaft 14 at the desired axial location therealong, a spring wire clip 58 is located in the "recess" provided by bevelled edge 28. The magnetic drum assembly 30 (with adaptor 34 securely fastened to the drum 32) is also fitted over the shaft 14 and a plurality of screws 60 are employed to secure the drum assembly 30 to the sleeve clamp 18 via holes 50 and threaded bores 24.

Alternatively, the sleeve clamp 18 may be loosely secured to the drum 32 by screws 60 and the sleeve clamp 18 and drum assembly 30 components slipped over the motor shaft 14 simultaneously as described in greater detail hereinbelow. Upon tightening the screws 60, the spring wire clip 58 is compressed between the sleeve clamp 18 and magnetic drum assembly 30 such that bevelled edge 28 and the adjacent bevelled edge 49 adjacent the adaptor aperture 48 radially compress the clip 58 against the shaft 14 to thereby firmly fix the magnetic drum assembly to the shaft 14.

It will be appreciated that a second sleeve clamp 18' (see FIG. 12) may be employed on the other side of the magnetic drum assembly 30 if desired, to insure even greater securement between the drum assembly 30 and output shaft 14. In the event two clamps 18, 18' are employed, longer fasteners 50' may be used in conjunction with nuts 61.

With reference now to FIGS. 1 as well as FIGS. 3-5, a sensor module assembly 62 includes a sensor module 64, a sensor module base unit 66 and a wiring cover 68. The sensor module 64 (FIGS. 1 and 3) includes a generally U-shaped housing including a bottom wall 70, and a pair of side walls 72, 74 which terminate in outwardly extending flanges 76, 78. A wall 80 extends across the back of the module. The bottom wall 70 is provided with probe aperture 82 for sensing probes attached to a circuit board (omitted from the drawings for purposes of clarity, but the electronics package is shown generally at 65 in FIG. 12) constructed in the manner disclosed in the '016 application.

The sensor module base unit 66 includes a back wall 84, and a pair of forwardly extending side walls 86 and 88. The back wall 84 is formed with an arcuate edge portion 85 which is adapted to seat on the rabbet edge 16' of end plate 16 of the motor M when the sensor module assembly is installed on the motor. Inner sides 90 and 92 of the side walls are provided with horizontal shoulders 94 and 96, respectively, which lie adjacent (but are not engaged by) the undersides 98, 100 of the flanges 76 and 78, respectively, of the sensor module. The back wall 84 is provided with a threaded aperture 102 receives the pivot screw 104 which extends through thru-hole 106 in the flange 78 of the sensor module 64 to thereby allow the sensor module 64 to move pivotally about a horizontal axis defined by the screw 104.

The shoulder 94 adjacent inner side 90 of side wall 86 is provided with a threaded aperture 108 which may be aligned with a threaded hole 110 in the flange of the sensor module 64. A differentially threaded screw 112, illustrated in FIG. 6, is provided with threads of different (finer) pitch on the upper end 114 than on the lower end 116. The threaded hole 108 is formed to accept the lower end 116, and the threaded hole 110 is formed to accept the upper end 114 of the screw. Rotation of the screw thus moves the sensor module 64 relative to the base unit 66 about the pivot screw 104. Since the finer pitch is in the upper portion 114 of the screw (received in hole 110), very precise control of the movement of the sensor module 64 movement can be achieved. As a result, the radial gap between the sensor module 65 (i.e., the sensing probes in the module) and the peripheral edge 40 of drum 32 can be accurately set to, for example, 0.018 plus or minus 0.008 inches.

Further in this regard, it will be appreciated that while the adjusting movement of the sensor module 64 is technically accurate, the amount of adjustment is so slight (on the order of a few thousandths of an inch), the movement for all practical purposes is linear, at least to the extent that there is no negative impact on the ability of the sensor module 64 to effectively sense the magnetic "Z" and "INC" tracks on the peripheral edge 40 of the drum 32.

The sensor module base unit 66 is also provided with a pair of thru-holes 118 and 120 extending laterally out of each of the side walls 86 and 88, respectively. One such hole may be used to carry the sensor cables (not shown) out of the base unit, while the other hole may be used to mount a liquid tight filter (also not shown) to prevent moisture from entering the sensor module assembly. The function of these holes may be reversed depending on the cable location requirements.

The sensor module base unit 66 is also provided with two pair of mounting holes 122, 124 and 126, 128. The selection of the appropriate pair of holes for selective use in mounting the sensor module assembly 62 to the motor casing end plate 16 will depend on the size of the motor casing end plate.

The wiring cover 68 is adapted to close the upper area of the sensor module base unit 66, and the cover 68 may be secured by fasteners 130 extending through holes (not shown) in the cover and into aligned holes 132 in the upper surface of the sensor module base unit.

Additional mounting holes 143 are provided for securing the sensor module assembly to cover for shipment as described in further detail below.

Figure 9:
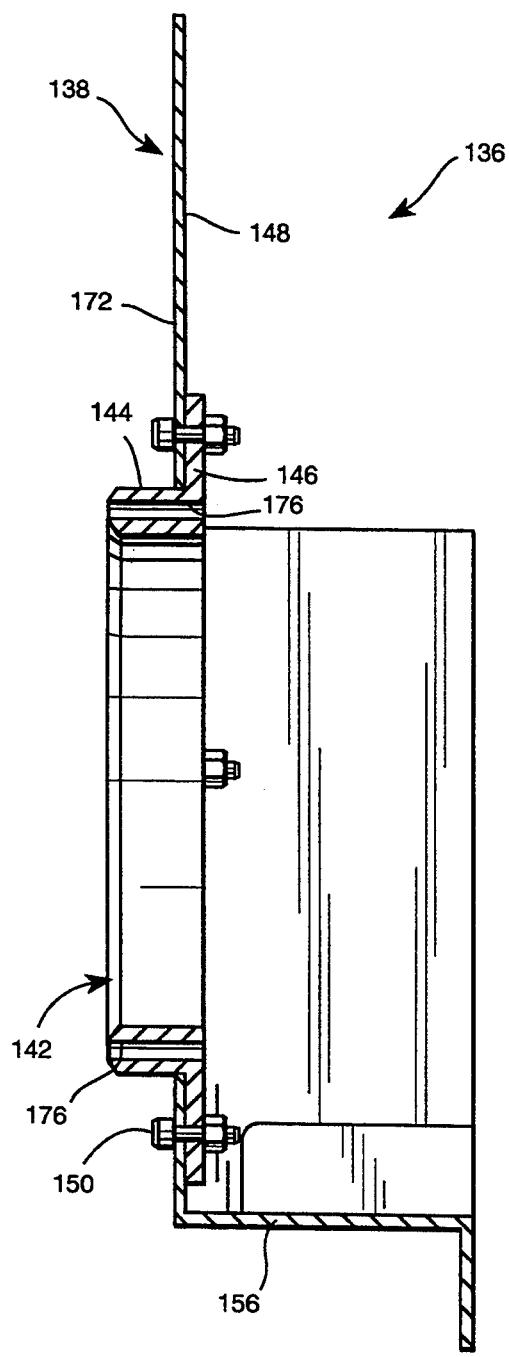
FIG. 9 is a side section of the cover unit illustrated in FIG. 8.
Figure 7:
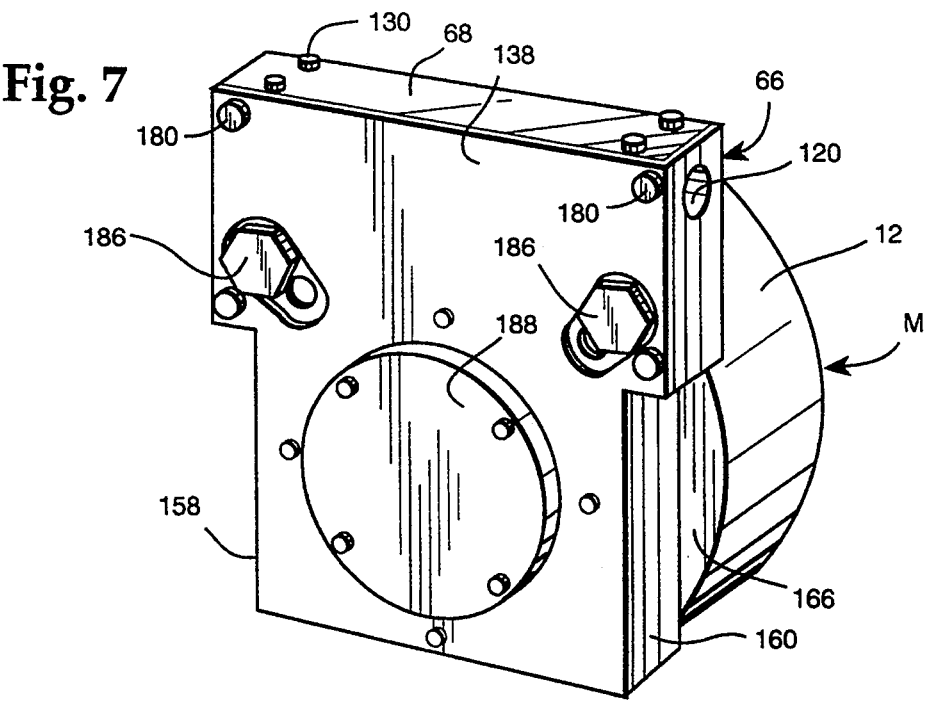
FIG. 7 is a perspective view of the tachometer assembly illustrated in FIG. 1 in place on the motor in a normal operating position.
Figure 8:
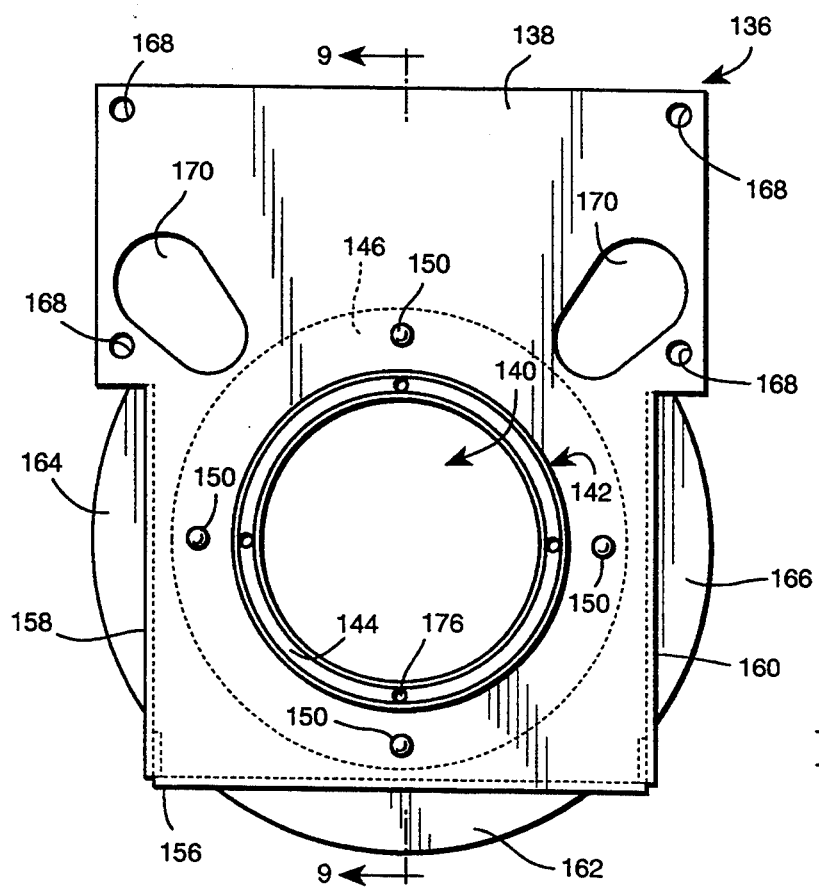
FIG. 8 is a front elevation of the cover unit only, illustrated in FIG. 7, with a center cap removed.

The reversible cover 136 in an exemplary embodiment of the invention is best seen in FIGS. 1 as well as FIGS. 7-9. The cover may be constructed of one or more pieces of metal stamping welded together or, for example, as a one-piece rigid plastic part.

Figure 10:
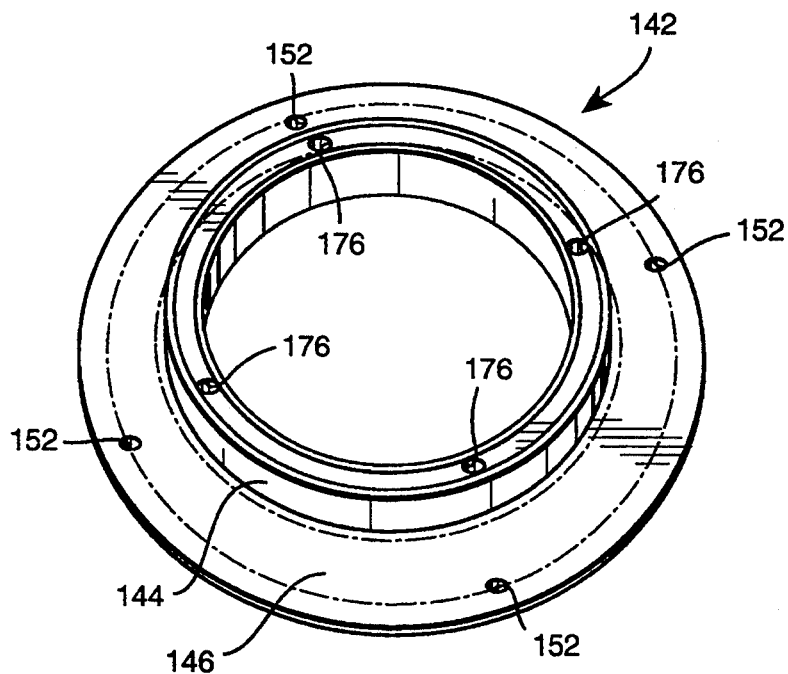
FIG. 10 is a perspective view of a spacer member utilized with the cover in FIGS. 1 and 9.
Figure 11:
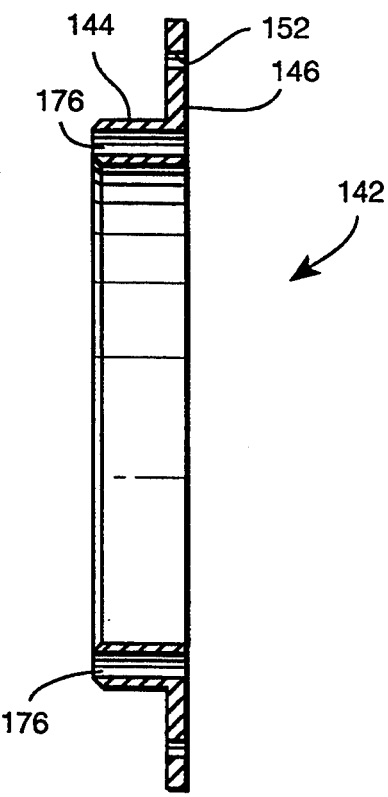
FIG. 11 is a side sectional view of the spacer member shown in FIG. 10.

The cover 136 has a forward wall 138 (wall 138 is "forward" when the cover 136 is in its in-use orientation which is reversed vis-a-vis the orientation in FIG. 1) is formed with a circular, central aperture 140 in which a spacer 142 is received. As best seen in FIGS. 10 and 11, spacer 142 is an annular, sleeve-like member including a cylindrically shaped axial portion 144 and a radial flange 146 extending from one end thereof. The spacer is inserted within the aperture 140 from the back side 148 of forward wall 138 such that the radial flange 146 abuts the back side 148. Screw fasteners 150 may be utilized to secure the spacer 142 to the forward wall 138 by means of aligned apertures 152, 154 in the spacer flange 146 and in the forward wall 138.

Retuning to FIGS. 7-9, a bottom wall 156 and a pair of side walls 158, 160 extend rearwardly from the back side 148 of the forward wall 138 to form a portion of an enclosure utilized to protect the drum and related tachometer hardware when in use. The rearward ends of bottom wall 156 and side walls 158 and 160 are provided with flanges 162, 164 and 166, respectively, which are designed to engage the motor housing end plate 16 when the cover is mounted thereto in an in-use orientation as shown in FIG. 7.

An upper portion of the forward wall 138 extends laterally beyond the side walls 158 and 160, and serves primarily as a mounting surface for mounting the sensor module assembly (module 64 and base unit 66) to the cover for shipment. To this end, the upper portion is provided with four holes 168 which align with holes 134 in the module base unit. The upper portion is also provided with a pair of irregular-shaped holes 170 which are designed to accommodate the bolt heads of the bolts used to secure the base unit 66 to the motor casing end plate 16, regardless of which pair of holes 122, 124 or 126, 128 in the base unit 66 are utilized.

The manner in which the cover 136 is utilized in two different modes, i.e., as an alignment tool prior to shipment and as an enclosure in normal use, will now be described.

Prior to shipment of the unit, the magnetic drum assembly 30 an the sensor module assembly 62 are mounted to the front side 172 of the forward wall 138 of the cover 136. The magnetic drum assembly 30 is secured to the forward wall 148 by means of screw fasteners 174 extending through holes 176 of the spacer member and into the aligned holes 178 in the peripheral portion of the drum adaptor 34.

When assembled, the peripheral wall 52 of the drum adaptor will fit snugly within the spacer 142 which is fixed to the cover.

The sensor module assembly 62 is secured to the forward face 48 of the cover by fasteners 180 which extend through holes 168 in the forward wall 138 of the cover 136 and into the threaded holes 134 in the sensor module base unit 66. With the magnetic drum 30 and the sensor module assembly 62 securely fastened to the front face 172 of forward wall 138, the radial gap between the sensor module 64 and the peripheral edge 40 of drum 32 may be set by adjustment screw 112. In this regard, easy access to the screw 112 is provided through the hole 110 in the sensor module 64, and the adjustment may be carried out with the use of an Allen wrench which is insertable into an appropriately shaped recess 182 in the upper portion 114 of the screw 112 (see FIG. 6). Following this adjustment, the wiring cover 68 is secured over the top of the base unit 62 to thereby enclosing and protect the wires and circuit board of the sensor module.

It will further be appreciated that the sleeve clamp 18 may be secured relatively loosely to the drum adaptor 34 for shipment purposes by means of the screw fasteners 60 extending through the holes 50 and into the aligned holes 24 in the sleeve clamp. If desired, the main mounting bolts 184 may also be secured to the assembly, extending through holes 170 in the cover 136 and into holes 122, 124 or 126, 128 in the base unit 66 and loosely secured by means of nuts or other appropriate means so that the fasteners 184 will not become detached from the assembly during shipment.

When the customer receives the unit, the entire assembly is slipped over the motor output shaft 14, with the latter extending through the central aperture 48 in the drum adaptor 34. It will be understood that the sleeve clamp 18 and associated wire clip 58 will also be received over motor shaft 14 ahead of the drum assembly 30. The unit is moved along the shaft 14 until the base unit 66 abuts the motor end plate or facing 16. The base unit 66 is then bolted to the motor facing or end plate 16 by means of the fasteners (bolts) 184 extending through the selected pair of holes 122, 124 or 126, 128 in the base unit and into the aligned and threaded holes 186 in the motor casing 12. Thereafter, the screw fasteners 60 are tightened within the threaded apertures 24 in the sleeve clamp 18 to thereby compressively secure the drum assembly 30 to the shaft 14 by means of the compressive force exerted by the wire clip 58 on the shaft. The orientation of all components upon initial assembly is thus as shown in FIG. 1.

In this arrangement, it will be appreciated that both the sensor module/sensor module base unit assembly 62 and the magnetic drum assembly are securely fastened to the motor casing 12 and motor output shaft 14, respectively, with the radial gap between sensor module probe and the magnetic patterns on the peripheral edge of the magnetic drum maintained. At this point, the sensor module assembly 62 and the magnetic drum assembly 30 also remain fixed to the cover 136.

The cover 136 may now be removed without disturbing the sensor module assembly 62 or magnetic drum assembly 30 simply by removing the screw fasteners 180 extending through the upper portion of the forward wall 138 of the cover 136 and into the base unit 66, and fasteners 174 extending through the cover spacer member 142 and into the drum adaptor 34. The cover 136 may then be turned 180° to its normal in-use orientation and reattached to the base unit 66, again using the screw fasteners 180, with the bolt heads 186 of bolts 184 accommodated by the irregularly shaped apertures 170 in the portion of the forward wall 138 of the cover 136. Again, radial gap between the sensor module assembly 62 and the magnetic drum assembly 30 is not disturbed during this reversal of the cover.

Figure 12:
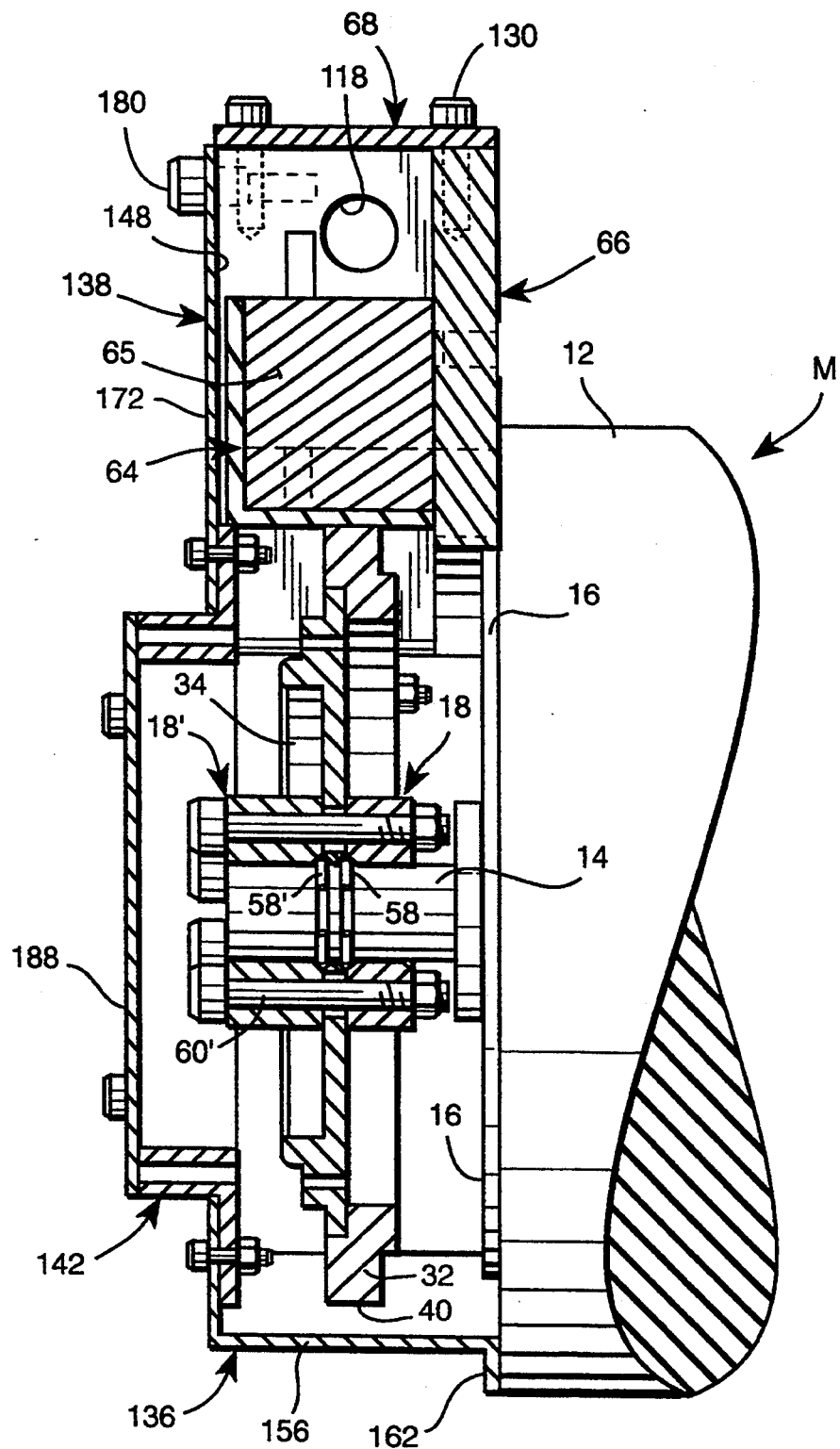
FIG. 12 is a partial side sectional of the cover and motor unit as shown in FIG. 7.

During use, then, the cover is oriented as shown in FIGS. 7 and 12. To further protect the tachometer assembly, an external cap 188 may be applied to cover 136 in the central area, closing off the central aperture 140 and thereby preventing dirt, debris and the like from entering the assembly.

It is also to be noted that, as already indicated above, a pair of sleeve clamps 18, 18' may be used to secure the magnetic drum assembly to the motor output shaft 14, and this alternative and preferred construction is shown in FIG. 12. In this embodiment, sleeve clamps 18 and 18' are arranged on either side of the drum adaptor 34, and extended fasteners 60' are used in conjunction with nuts 61 to compressively sandwich the drum adaptor 34' between claims 18, 18'. This causes a pair of clips 58, 58' to radially compress against the motor shaft 14' to more securely hold the drum assembly 30' to the shaft.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tachometer assembly comprising a sensor module assembly; a magnetic drum assembly; and a cover supporting said sensor module assembly and said magnetic drum in predetermined radial alignment with each other in a first orientation of said cover; said cover adapted to partially enclose and protect said sensor module assembly and said magnetic drum assembly in a second orientation reversed relative to said first orientation.

2. The tachometer assembly according to claim 1 wherein said sensor module assembly includes a sensor module supported in a sensor module base unit, and wherein means are provided for adjusting said sensor module relative to said base unit and to said magnetic drum assembly.

3. The tachometer assembly according to claim 1 and including means for attaching said magnetic drum assembly to an output shaft of a rotary machine.

4. The tachometer assembly according to claim 1 and including means for maintaining said predetermined radial alignment when said cover is in said second orientation.

5. The tachometer assembly according to claim 1 wherein said magnetic drum assembly is provided with a magnetic pattern about an annular peripheral edge thereof.

6. The tachometer assembly according to claim 3 wherein said means for attaching the magnetic drum assembly to the output shaft of the rotary machine comprises at least one sleeve clamp slidably receivable over the output shaft, the sleeve clamp including a resilient wire clip radially compressible against the shaft when said sleeve clamp is secured to said drum assembly.

7. The tachometer assembly of claim 6 wherein a pair of identical sleeve clamps are utilized, one on either side of said magnetic drum assembly.

8. The tachometer assembly of claim 2 wherein said sensor module is pivotably mounted in said sensor module base unit, and an adjustment screw is provided to adjust the sensor module relative to said sensor module base unit and said magnetic drum assembly.

9. The tachometer assembly of claim 8 wherein said adjustment screw has a threaded upper portion of one pitch and a threaded lower portion of another pitch.

10. The tachometer assembly of claim 3 and including means for attaching said sensor module assembly to a casing of the rotary machine.

11. A tachometer assembly comprising:
a magnetic drum assembly having a peripheral edge surface, said drum assembly adapted for attachment to an output shaft of a rotary machine;
a sensor module;
a sensor module base unit adjustably supporting said sensor module, said sensor module base unit adapted for attachment to a casing of the rotary machine;
a cover supporting, in a first, non-use orientation, said magnetic drum assembly, said sensor module and said sensor module base unit in a spatial relationship such that a predetermined radial gap between the sensor module and said peripheral edge surface of said magnetic drum is established; said magnetic drum, assembly having means for attaching said magnetic drum assembly to the output shaft, and said sensor module base unit having means for attaching said sensor module base unit to an end plate of the rotary machine with said cover in said first non-use position, said cover adapted for removal, reversal and remounting to the rotatable machine casing in a second, in-use orientation which is reversed relative to said first, non-use orientation, and without disturbing said predetermined radial gap.

12. The tachometer assembly of claim 11 wherein said peripheral edge surface is provided with at least one magnetic pattern and said sensor module is provided with at least one sensing probe; and wherein said predetermined gap is established between said probe and said magnetic pattern.

13. The tachometer assembly of claim 11 wherein said sensor module is pivotably adjustably mounted within said sensor module base unit.

14. The tachometer assembly of claim 13 wherein said sensor module is pivotably mounted by means of a pivot pin to said sensor module base unit at one end of said sensor module, and wherein an adjustment screw extends between said sensor module and said sensor module at another end of said sensor module, said adjustment screw extending in a direction perpendicular to said pivot pin.

15. The tachometer assembly of claim 14 wherein said adjustment screw is a differential screw with threads at one end of one pitch and threads at the other end of a different pitch than said one pitch.

16. The tachometer assembly of claim 11 wherein said drum assembly includes a radially outer drum and a radially inner adaptor.

17. The tachometer assembly of claim 11 wherein said magnetic drum has a central aperture, said tachometer assembly further comprising a sleeve clamp receivable on the shaft in concentric relationship with said magnetic drum, and means insertable between said drum and said sleeve clamp for exerting a radially compressive force on the shaft when said sleeve clamp is secured in axial compression to said magnetic drum.

18. The tachometer assembly of claim 16 wherein said cover includes an end wall, a pair of side walls and a bottom wall, said end wall having an aperture, said aperture having a spacer member mounted therein, said spacer having a magnetic surface at one end thereof adapted to engage said radially inner adaptor.

19. The tachometer assembly of claim 18 wherein said spacer member is formed with a radial flange at another end thereof, opposite said one end.

20. A tachometer assembly comprising:
a cover unit having an end wall with front and back surfaces, a pair of side walls extending from said front surface of said end wall, and a bottom wall extending from said front surface of said end wall between said side walls, said end wall having a centrally located aperture therein;
a magnetic drum assembly having a circumferential peripheral edge surface provided with at least one magnetic pattern thereon;
a sensor module assembly including at least one sensing probe;
wherein said magnetic drum assembly is mounted on said back surface of said end wall substantially concentrically with said centrally located apertures, and said sensor module assembly is mounted on said back surface of said end wall in a first shipping orientation to maintain said at least one sensing probe a predetermined radial distance from said magnetic pattern; and wherein said cover unit is adapted to be reversed to a use orientation such that said sensor module assembly and said magnetic drum assembly will engage said front surface of said cover unit and said side walls and said bottom wall will at least partially enclose said sensor module assembly and said magnetic drum assembly.

21. The tachometer assembly of claim 20 wherein said centrally located aperture is fitted with an annular spacer member comprising an axially extending, hollow tubular portion having a radial flange at one end thereof, said flange engaging one tubular portion projecting through said aperture to provide alternative magnetic drum engaging surfaces on either surface of said end wall.

22. The tachometer assembly of claim 20 wherein said sensor module assembly comprises a sensor module mounting said at least one probe, and a sensor module base unit, wherein said sensor module is pivotably, adjustably mounted within said sensor module base unit.

23. The tachometer assembly of claim 22 wherein said sensor module is pivotably secured to said sensor module, and an adjustment screw extends between said module, and an adjustment screw extends between said sensor module and said sensor module at another end of said sensor module, said adjustment screw extending in a direction perpendicular to a pivot pin securing said sensor module to said sensor module base unit.

24. The tachometer assembly of claim 23 wherein said adjustment screw is a differential screw with threads at one end of one pitch and threads at the other end of a different pitch than said one pitch.

25. The tachometer assembly of claim 22 wherein said sensor module base unit includes a wiring cover plate.

26. The tachometer assembly of claim 20 wherein said magnetic drum has a central aperture, said tachometer assembly further comprising at least one sleeve clamp receivable on the shaft in concentric relationship with said magnetic drum, and means insertable between said drum and said sleeve clamp for exerting a radially compressive force on the shaft when said sleeve clamp is secured in axial compression to said magnetic drum.

27. The tachometer assembly of claim 22 wherein said sensor module base unit includes an end wall and a pair of side walls, each side wall having a shoulder portion, and further wherein said sensor module includes a pair of oppositely directed flanges seated on said shoulder portions.

28. The tachometer assembly of claim 27 wherein one of said oppositely directed flanges is provided with an axially extending aperture for receiving a pivot pin, said end wall of said sensor module base unit having a threaded aperture therein for receiving a threaded end of said pivot pin.

29. The tachometer assembly of claim 28 wherein the other of said oppositely directed flanges is provided with a first threaded aperture extending in a direction perpendicular to said axially extending aperture, and a corresponding one of said shoulder portions is provided with a second threaded aperture in substantial alignment with said first threaded aperture, and further wherein a differentially threaded adjustment screw extends between said first and second threaded apertures, such that rotation of said adjustment screw moves said at least one sensing probe relative to said sensor module base unit and relative to said at least one magnetic pattern.

30. A method of assembling and aligning components of a tachometer relative to each other and to a shaft of a rotary machine, the components including a magnetic drum, a periphery of which is provided with at least one magnetic pattern; a sensor module assembly including a sensor module having a probe, and a sensor module base unit supporting said sensor module; and a cover, the method comprising the steps of:
 a) mounting said magnetic drum and said sensor module assembly on one side of said cover;
 b) securing said magnetic drum on the rotary machine shaft;
 c) securing said sensor module assembly to a casing of said rotary machine through which the shaft projects;
 d) removing the cover, leaving the magnetic drum on the shaft and the sensor module assembly on the casing of the rotary machine;
 e) reversing the cover; and
 f) reattaching the cover to the casing.

31. The method of claim 30 and including the step of, prior to step b), adjusting said sensor module and probe relative to said sensor module base unit and said magnetic drum to obtain a predetermined radial gap between said probe and said magnetic pattern of said magnetic drum.

* * * * *